(12) United States Patent
Kimura et al.

(10) Patent No.: US 11,643,045 B2
(45) Date of Patent: May 9, 2023

(54) VEHICLE SEAT BELT DEVICE

(71) Applicant: HONDA MOTOR CO., LTD., Tokyo (JP)

(72) Inventors: Kensuke Kimura, Tokyo (JP); Yusuke Ogata, Tokyo (JP); Mitsuru Nakano, Tokyo (JP); Hiroaki Azumi, Tokyo (JP); Hidenori Watanabe, Utsunomiya (JP); Kenta Oguma, Utsunomiya (JP); Hirokazu Kobayashi, Nagoya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/541,366

(22) Filed: Dec. 3, 2021

(65) Prior Publication Data

US 2022/0185228 A1 Jun. 16, 2022

(30) Foreign Application Priority Data

Dec. 15, 2020 (JP) .............................. JP2020-207732

(51) Int. Cl.
*B60N 2/68* (2006.01)
*B60R 22/18* (2006.01)
*B60R 22/26* (2006.01)

(52) U.S. Cl.
CPC .............. *B60R 22/26* (2013.01); *B60N 2/688* (2013.01); *B60R 2022/1806* (2013.01)

(58) Field of Classification Search
CPC ........................ B60N 2/688; B60R 2022/1806
See application file for complete search history.

(56) References Cited

U.S. PATENT DOCUMENTS

| | | | |
|---|---|---|---|
| 2009/0273223 A1 | 11/2009 | Gomi et al. | |
| 2018/0093597 A1* | 4/2018 | Namboodiri | ............ B60R 22/26 |
| 2020/0269804 A1 | 8/2020 | Morgan | |
| 2020/0398718 A1* | 12/2020 | Watanabe | ............ B60N 2/5816 |

FOREIGN PATENT DOCUMENTS

| | | | |
|---|---|---|---|
| CN | 112406776 A | * | 2/2021 |
| JP | 2010-023793 A | | 2/2010 |
| JP | 2015-013537 A | | 1/2015 |
| WO | 2007/052453 A1 | | 5/2007 |

OTHER PUBLICATIONS

Office Action received in corresponding Japanese application No. 2020-207732 dated Jun. 7, 2022 with English translation (4 pages).

* cited by examiner

*Primary Examiner* — Timothy J Brindley
(74) *Attorney, Agent, or Firm* — Rankin, Hill & Clark LLP

(57) ABSTRACT

A vehicle seat belt device including: a buckle that is positioned so as to face a corner formed by a seat cushion and a seat back those constitute a rear center seat, and to which a tang of a seat belt is detachably attached; a webbing that connects the buckle to a lower floor; a loop portion formed on a side surface part of the buckle; and a first band that is inserted into the loop portion, is engaged with the buckle at one extending end, and is fixed to the seat back at the other end, is provided.

3 Claims, 5 Drawing Sheets

VEHICLE SEAT BELT DEVICE

BACKGROUND OF THE INVENTION

Field of the Invention

The present invention relates to a vehicle seat belt device.

Description of the Related Art

A conventional vehicle seat belt device is known to have a buckle that is connected to an anchor provided below a seat cushion via a webbing, and is provided with a cylindrical boot (see Patent Literature 1). The buckle is inserted into a slit provided at a rear of the seat cushion to stand on its own in the slit. According to such a vehicle seat belt device, the buckle is inserted into the slit provided at the rear of the seat cushion so that the buckle can stand on its own in the slit, and the buckle can be placed at a proper position on a side portion of a seat in an occupant seated state.

RELATED ART DOCUMENT(S)

Patent Literature(s)

Patent Literature 1: JP 2010-023793 A

SUMMARY OF THE INVENTION

Problems to be Solved by the Invention

However, in a recent vehicle, in order to make highly efficient use of an interior space for various purposes, a seat arrangement method to change positions of seat cushions and seat backs has become more diverse than in the past.

Therefore, in the conventional seat belt device (see Patent Literature 1), when a seat in a normal occupant seated state is arranged and then returned to the occupant seated state, the buckle gets between the seat cushion and the seat back or falls below the seat cushion. The buckle is not always placed at the proper position because the buckle gets between the seat cushions or falls below the seat cushion.

An object of the present invention is to provide a vehicle seat belt device that can always place a buckle at a proper position, unlike the conventional device.

Means of Solving the Problems

A vehicle seat belt device of the present invention includes: a buckle that is positioned so as to face a corner formed by a seat cushion and a seat back those constitute a vehicle seat, and to which a tang of a seat belt is detachably attached; a webbing that connects the buckle to a floor; a loop portion formed on a side surface part of the buckle; and a band that is inserted into the loop portion, is engaged with the buckle at one extending end, and is fixed to the seat back at the other end.

Effects of the Invention

According to the present invention, it is possible to provide a vehicle seat belt device that can always place a buckle at a proper position, unlike the conventional device.

DESCRIPTION OF THE EMBODIMENTS

Next, a vehicle seat belt device according to an embodiment of the present invention will be explained.

The vehicle seat belt device of this embodiment (hereinafter referred to simply as "the seat belt device") is mainly characterized in that a buckle, to which a tang of a seat belt is detachably attached, has a loop portion on a side surface part, a band inserted into the loop portion is engaged with the buckle at one end and is fixed to a seat back at the other end.

In this embodiment, the seat belt device provided at a rear center seat (including a second row of seats in a three-row seat) among a three-seater seats arranged side-by-side in a vehicle width direction at a rear of a vehicle will be explained. However, the present invention is not limited to this embodiment as long as the seat belt device is provided at vehicle seats as described below.

Figure 1:
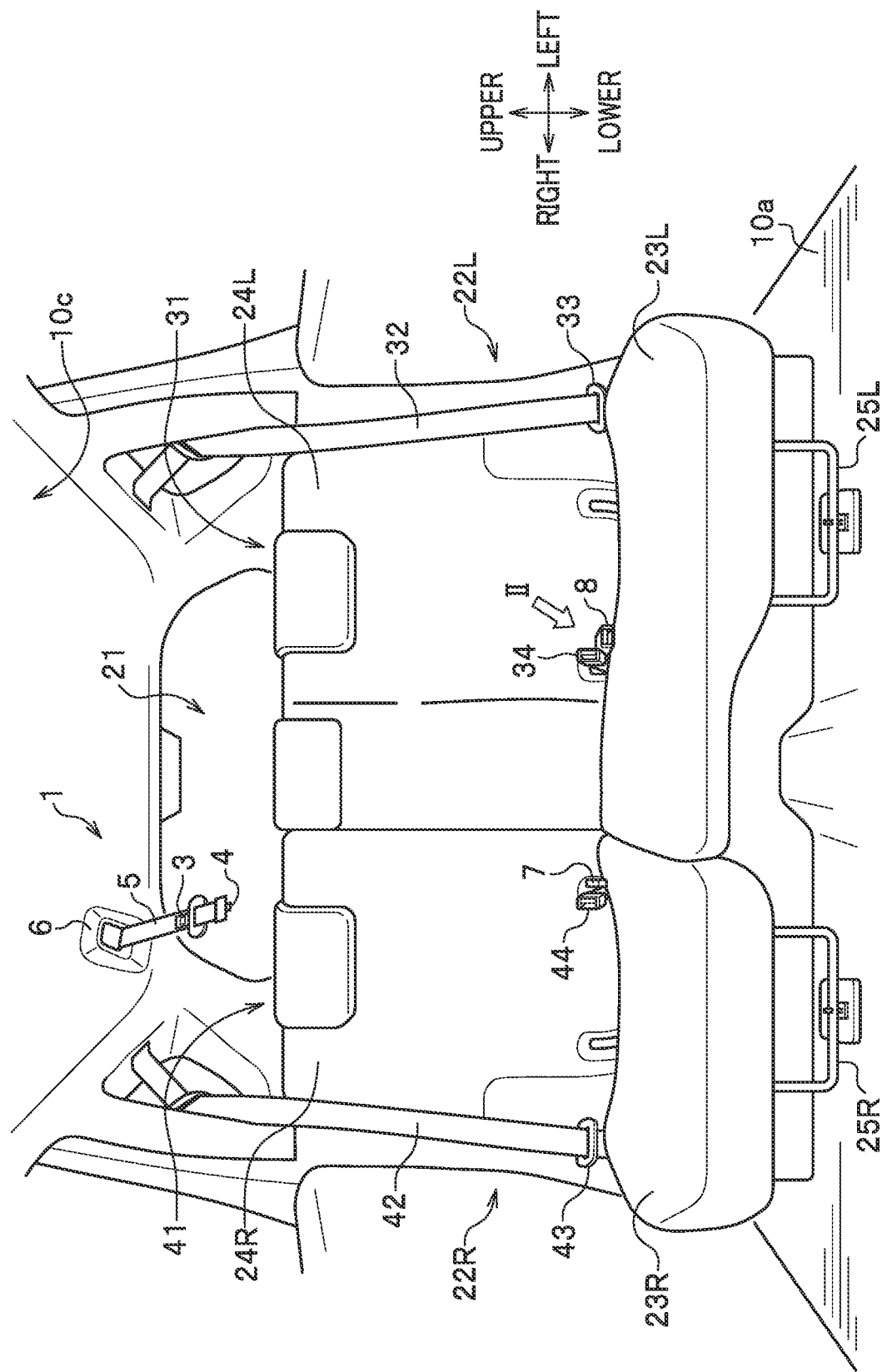
FIG. 1 is a partially enlarged perspective view of a rear of a vehicle provided with a vehicle seat belt device according to an embodiment of the present invention.

FIG. 1 is a partially enlarged perspective view of a rear of a vehicle provided with a seat belt device 1 of this embodiment. Front, rear, left, right, upper, and lower directions in following explanations correspond to front, rear, left, right, upper, and lower directions of the vehicle.

As shown in FIG. 1, a narrow seat 22R is located at a right side and a wide seat 22L is located at a left side in the vehicle width direction. A rear center seat 21 spans each of a right half of the wide seat 22L and a left end of the narrow seat 22R to be located at a center of the vehicle width direction. The seat belt device 1 of this embodiment is applied to the rear center seat 21. However, the narrow seat 22R and the wide seat 22L may be formed as a single unit without being separated from each other.

In FIG. 1, a reference numeral 23R indicates a seat cushion of the narrow seat 22R and a reference numeral 23L indicates a seat cushion of the wide seat 22L. Also, a reference numeral 24R indicates a seat back of the narrow seat 22R and a reference numeral 24L indicates a seat back of the wide seat 22L. A reference numeral 25R indicates a foldable stand leg that supports the seat cushion 23R on a lower floor 10a, and a reference numeral 25L indicates a foldable stand leg that supports the seat cushion 23L on the lower floor 10a.

The seat belt device 1 of this embodiment has a retractor 6 for a center occupant provided at a rear of a roof lining 10c, a seat belt 5 that is pulled out from the retractor 6, a tang 4 that is attached to an end of the seat belt 5, and a tang 3 that is movably provided at the middle of an extension of the seat belt 5.

The seat belt device 1 is provided with a buckle 8 that faces a corner formed by the seat cushion 23L and seat back 24L.

The buckle 8 constitutes a buckle assembly 2 (see FIG. 2) and corresponds to a term "buckle" in claims. The buckle 8 will be explained below in detail along with the buckle assembly 2.

In FIG. 1, a reference numeral 33 indicates a tang of a seat belt 32 for a rear left seat 31, and a reference numeral 34 indicates a buckle. Also, in FIG. 1, a reference numeral 43 indicates a tang of a seat belt 42 for a rear right seat 41, and a reference numeral 44 indicates a buckle.

When using the seat belt device 1, an occupant seated on the rear center seat 21 pulls the seat belt 5 from the retractor 6 and connects the tang 4 to a connecting buckle 7. Next, the occupant further pulls the seat belt 5 from the retractor 6 and connects the tang 3 to the buckle 8. Then, the occupant seated on the rear center seat 21 is supported at three points by the seat belt 5.

Buckle Assembly

Next, the buckle assembly 2 will be explained in more detail.

Figure 2:
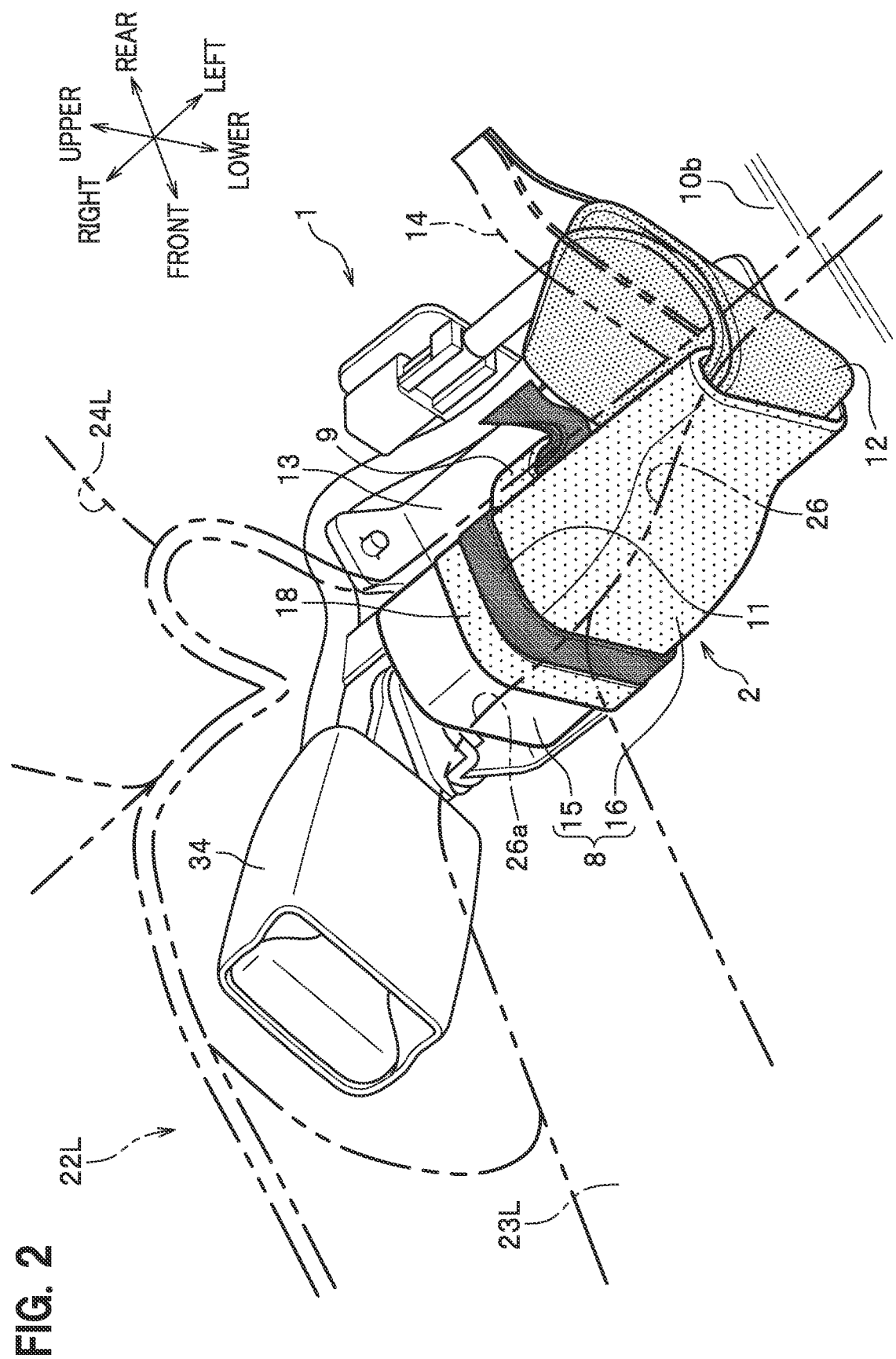
FIG. 2 is a partially enlarged perspective view of the vehicle seat belt device seen in a direction of an arrow II in FIG. 1.

FIG. 2 is a partially enlarged perspective view of an area around the buckle assembly 2, which constitutes the vehicle seat belt device 1, seen in the direction of the arrow II in FIG. 1.

In FIG. 2, the seat cushion 23L and the seat back 24L of the wide seat 22L are shown by virtual lines (double-dotted chain lines) for convenience of drawing. In FIG. 2, a reference numeral 34 indicates a buckle for the rear left seat 31 (see FIG. 1).

As shown in FIG. 2, the buckle assembly 2 is provided with the buckle 8, a loop portion 9, a first band 11, a webbing 12, an anchor plate 13, and a second band 14.

In FIG. 2, the second band 14 is shown by a virtual line (double-dotted chain line) for convenience of drawing.

The first band 11 corresponds to a term "band" in claims. The second band 14 corresponds to a term "other band" in claims.

Buckle

As shown in FIG. 1, the buckle 8 is placed so as to face the corner formed by the seat cushion 23L and the seat back 24L.

As shown in FIG. 2, when not in use, the buckle 8 is placed in a container 26, which consists of a recess formed on the seat cushion 23L.

In this embodiment, the container 26 has a right-angled trapezoidal opening 26a in a top view depending on a configuration of the buckle 8 when not in use. In other words, the container 26 has a right-angled trapezoidal bottom surface (not shown) corresponding to a shape of the buckle 8 described below, and consists of an approximately square pole space with a height in an upper-lower direction. The container 26 is formed at a rear end of the seat cushion 23L, and is open to a lower end of the seat back 24L. Also, the container 26 is open to a side adjacent to the buckle 34 at the rear left seat.

As shown in FIG. 2, when not in use, a top surface of the buckle 8 placed in the container 26 is approximately flush with a top surface of the seat cushion 23L. Also, when not in use, the buckle 8 placed in the container 26 directs a connection opening 17a (see FIG. 4), to which the tang 3 (see FIG. 1) is connected, toward a right side in the vehicle width direction shown in FIG. 2. In other words, when in use, an occupant raises the buckle 8 from the container 26 so that the connection opening 17a (see FIG. 4) is directed upward.

Figure 3:
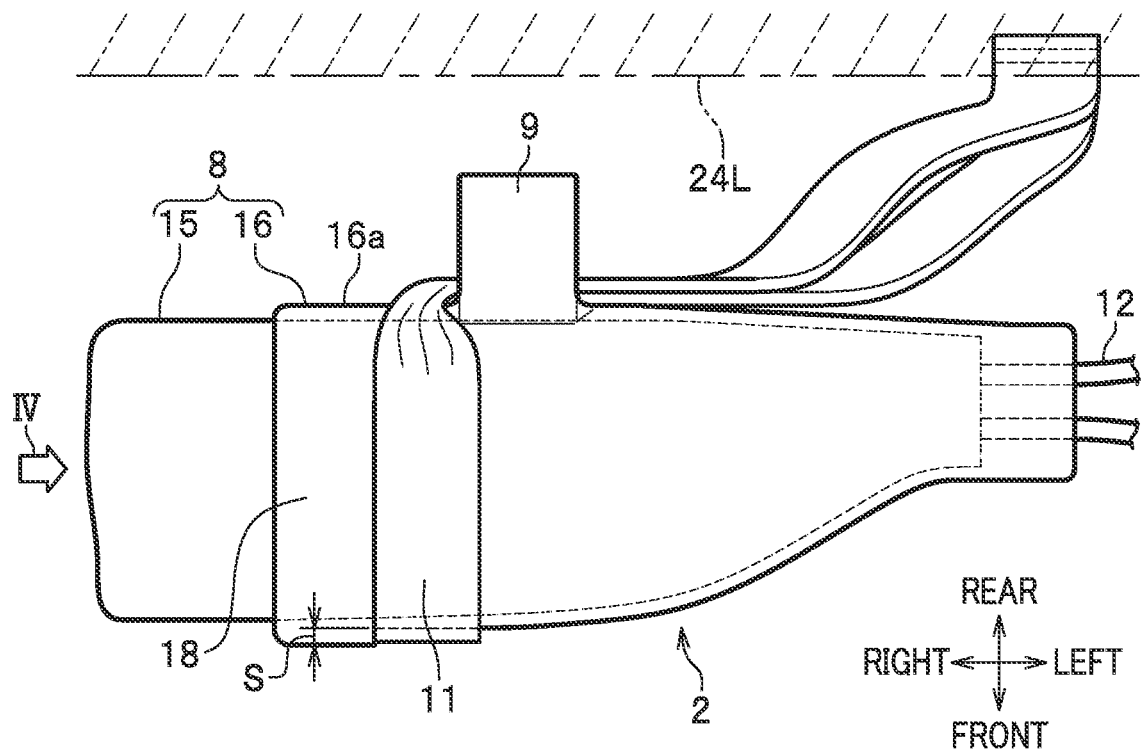
FIG. 3 is a top view of a buckle assembly including a buckle that constitutes the vehicle seat belt device according to the embodiment of the present invention.
Figure 4:
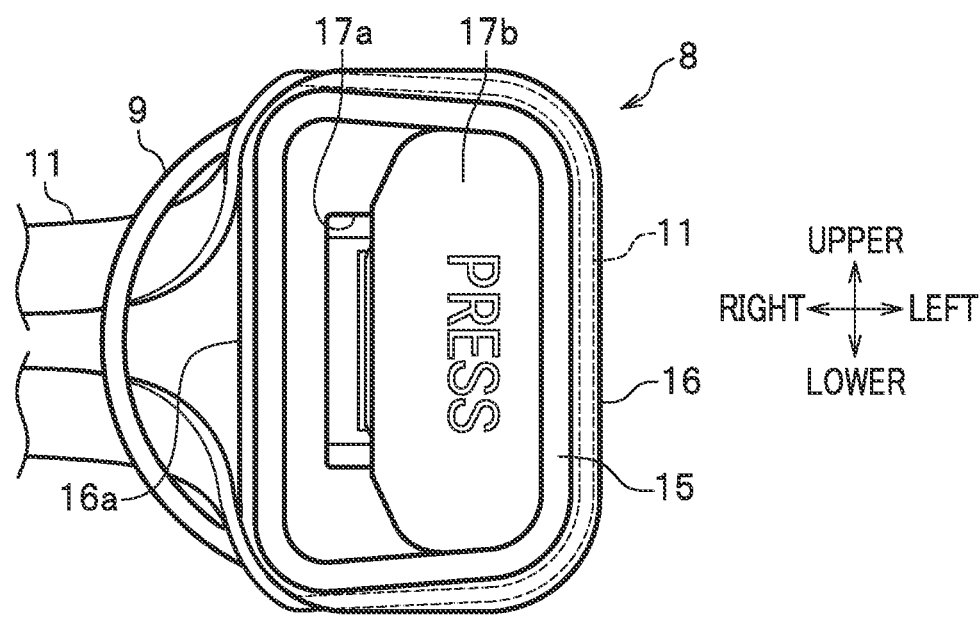
FIG. 4 is a right-side view of the buckle seen in a direction of an arrow IV in FIG. 3.

FIG. 3 is a top view of the buckle assembly 2 including the buckle 8 placed in the container 26 (see FIG. 2). FIG. 4 is a right-side view of the buckle 8 seen in the direction of the arrow IV in FIG. 3. In FIG. 3, a lower end of the seat back 24L extending in the vehicle width direction (a left-right direction) is shown by a virtual line (double-dotted chain line).

As shown in FIG. 3, the buckle 8 has a right-angled trapezoidal top surface shape.

Also, as shown in FIG. 4, the connection opening 17a, to which the tang 3 (see FIG. 1) is connected, is formed on a right-side surface of the buckle 8, and a shape of the right-side surface of the buckle 8 is rectangular.

In other words, the buckle 8 has an approximately square pole shape that fits into the inner space of the container 26.

As shown in FIG. 3, the buckle 8 of this embodiment has a buckle body 15 and a boot 16.

The buckle body 15 has a latch member that fits into a latch hole of the tang 3 (see FIG. 1) inserted into the connection opening 17a (see FIG. 4) to be engaged with the tang 3, a release button 17b (see FIG. 4) that breaks an engagement between the latch hole and the latch member, and a fixing part that fixes one end of the webbing 12 (see FIG. 3).

The buckle 8 is fitted into a boot 16 described below, and has an approximately square pole outline.

As shown in FIG. 3, the boot 16 is made of a cylindrical body into which the buckle body 15 is fitted.

The boot 16 of this embodiment is assumed to be made of an elastomer such as a rubber. However, the material of the boot 16 is not limited to the elastomer.

As shown in FIG. 3, the boot 16 covers a side surface part of the buckle body 15 except a right side of the side surface part of the buckle body 15 that is closer to the connection opening 17a (see FIG. 4).

As shown in FIG. 3, the boot 16 has a loop portion 9 on a side surface part 16a opposite to a front edge of a lower end of the seat back 24L.

As shown in FIG. 4, the loop portion 9 is integrally molded with the boot 16 to form an arc-shaped bridge that spans each of upper and lower edges of the side surface part 16a.

As shown in FIG. 3, the loop portion 9 of this embodiment is integrally molded with the boot 16 to be placed at a center position of the buckle 8 in the vehicle width direction (the left-right direction) in the top view of buckle assembly 2.

Also, the boot 16 has a step part 18 at a right end adjacent to an exposed portion of the buckle body 15.

The step part 18 is partially thicker than the thickness of the boot 16 at a position (an engaged position) where a first band 11 explained below is placed. In other words, as shown in FIG. 3, a surface of the boot 16 that forms the step part 18 is formed so that a step S is farther away from the buckle body 15 than the surface of the boot 16 where the first band 11 is placed.

First Band

As shown in FIG. 2, the first band 11 (band) is maintained along a side surface part of the buckle 8 (boot 16) in a circumferential direction between the step part 18 and the loop portion 9.

The first band 11 of this embodiment is assumed to be a strip of an elastomer such as a rubber. However, the material of the first band 11 is not limited to the elastomer. Flexible materials such as a webbing (fabric) can be used.

As shown in FIGS. 3 and 4, the first band 11 is inserted into the loop portion 9 and engaged with the buckle 8 (boot 16) at one end. As shown in FIG. 3, the first band 11 is fixed to the seat back 24L at the other end.

Specifically, one end of the first band 11 is defined by a two-folded part, and is attached to the buckle 8 (boot 16) in a band assembly process (see FIGS. 5A to 5C) described below.

Also, the other end of the first band 11 is defined by overlapping two-folded forked ends. As shown in FIG. 3, the other end of the first band 11 is fixed to a bottom of the seat back 24L behind the front edge of the lower end of the seat back 24L. A method of fixing the first band 11 to the seat back 24L is not limited. For example, sewing, adhesion, eyelets, caulking rivets, or magic tapes can be used.

Webbing, Anchor Plate, and Floor

A webbing 12 (see FIG. 2) of this embodiment assumed to be a thick strip fabric like the seat belt 5 (see FIG. 1).

As shown in FIG. 2, the webbing 12 has a base at a side fixed to the buckle 8 (buckle body 15), extends downward between the seat cushion 23L and the seat back 24L, and is connected to an anchor plate 13 explained below.

The webbing 12 is made of a superposition of strip fabrics arranged to reciprocate multiple times between the buckle 8 (buckle body 15) and the anchor plate 13.

As shown in FIG. 2, the anchor plate 13 is made of a thick steel plate bent and fixed to a higher floor 10b by bolting or welding. As described above, the webbing 12 extending from the buckle 8 (buckle body 15) side is connected to the anchor plate 13. The higher floor 10b corresponds to a term "floor" in claims.

A higher floor 10b is formed as a step that is higher than the lower floor 10a (see FIG. 1) behind which a stand leg 25L (see FIG. 1) of the seat cushion 23L (see FIG. 1) is supported. The higher floor 10b (see FIG. 1) has a base part (not shown) that supports the lower end of the seat back 24L (see FIG. 2). The rear end of the seat cushion 23L (see FIG. 2) is rotatably attached to a lower part of the seat back 24L (see FIG. 2) via a rotation arm (not shown). In this way, the seat back 24L and the seat cushion 23L can be arranged in tip-up and dive down positions as explained below in detail.

Second Band

As shown in FIG. 2, the second band 14 (other band) engages the webbing 12 to the seat back 24L.

The second band 14 of this embodiment is assumed to be made of a strip of an elastomer such as a rubber. However, the material of the second band 14 is not limited to the elastomer. Flexible materials such as webbing (fabric) can be used.

One end of such second band 14 (other band) is looped around the superimposed webbing 12, and the other end, which consists of the overlapped two-folded forked ends, is fixed to the bottom of the seat back 24L. A methods of fixing the second band 14 to the seat back 24L is not limited. For example, sewing, adhesion, eyelets, caulking rivets, or magic tapes can be used.

Method of Assembling First Band to Buckle

Next, a method of assembling the first band 11 (see FIG. 3) to the buckle 8 (see FIG. 3) will be explained.

Figure 5A:
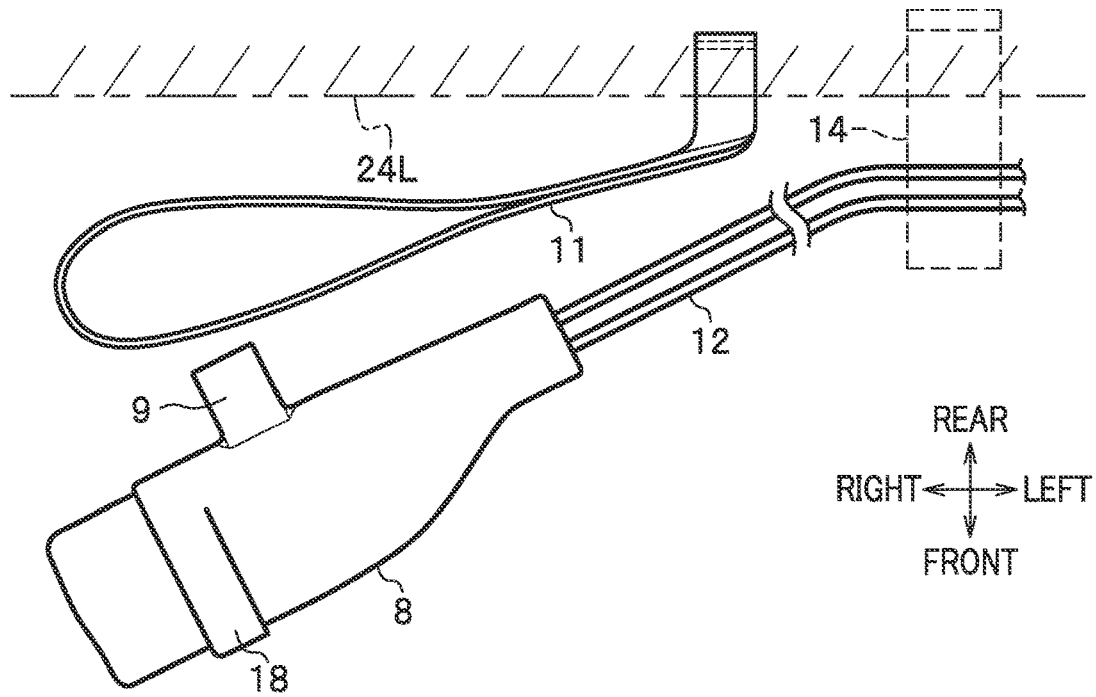
FIG. 5A is a first process diagram of assembling a band to the buckle of the buckle assembly.
Figure 5B:
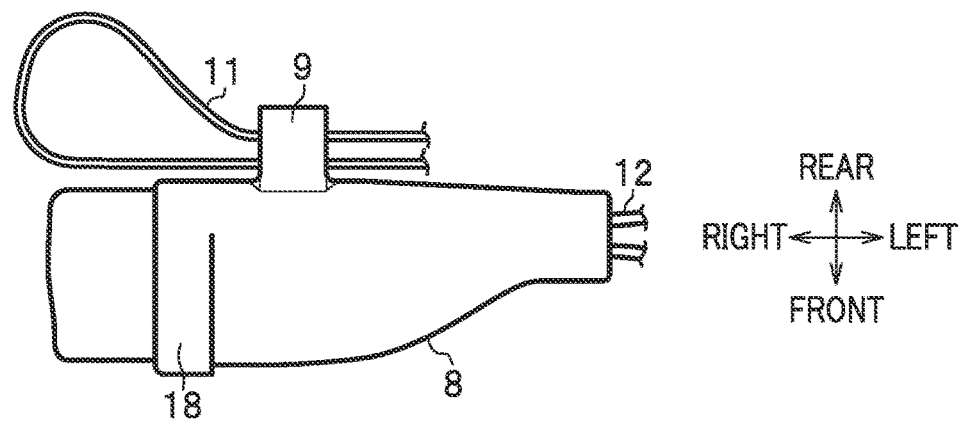
FIG. 5B is a second process diagram of assembling the band to the buckle of the buckle assembly.
Figure 5C:
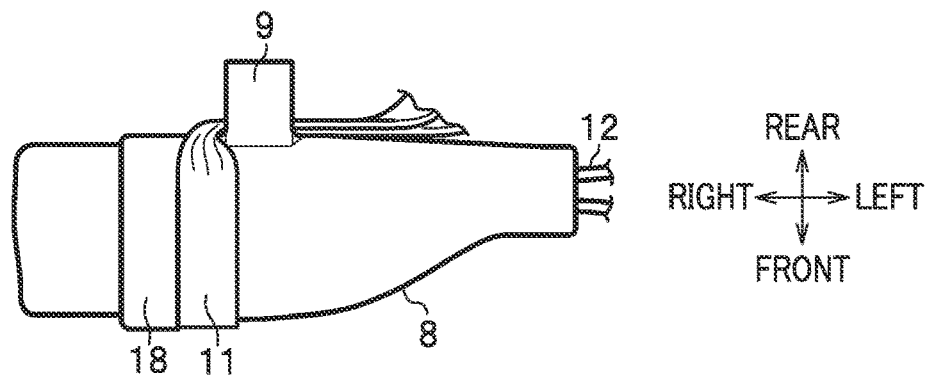
FIG. 5C is a third process diagram of assembling the band to the buckle of the buckle assembly.

FIG. 5A is a first process diagram of assembling a band to the buckle 8. FIG. 5B is a second process diagram of assembling the band to the buckle 8. FIG. 5C is a third process diagram of assembling the band to the buckle 8.

As shown in FIG. 5A, in the first process, the first band 11 (band) and the second band 14 (other band) are fixed to the seat back 24L, and the webbing 12 is inserted into one end of the second band 14.

Next, as shown in FIG. 5B, in the second process, the first band 11 is inserted into the loop portion 9 of the buckle 8.

Then, as shown in FIG. 5C, in the third process, one end of the first band 11 is fitted between the step part 18 and the loop portion 9 of the buckle 8, and the first band 11 is placed along the side surface part of the buckle 8 in the circumferential direction.

In this case, the first band 11 can be twisted at least half a turn to form a ring at one end, and then can be placed along the side surface part of the buckle 8.

Then, as shown in FIG. 2, the buckle 8 maintained at one end of the first band 11 is placed in the container 26 (see FIG. 2) of the seat cushion 23L (see FIG. 2) so that the loop portion 9 faces the seat back 24L (rearward). In this way, the buckle 8 in the seat belt device 1 of this embodiment will be placed at an initial position.

Advantageous Effects

Next, advantageous effects of the seat belt device 1 of this embodiment will be explained.

As described above, the rear center seat 21 (see FIG. 1) having the seat belt device 1 (see FIG. 1) of this embodiment allows seat arrangements such as a tip-up and a dive-down.

Here, the term "tip-up" means that the seat cushion 23L (see FIG. 1), the rear end of which is attached to the seat back 24L (see FIG. 1) via a rotation arm (not shown) that is axially supported at the bottom of the seat back 24L (see FIG. 1), is raised toward the seat back 24L by the rotation arm that rotates around an axis.

According to this type of the tip-up, a large vertical space from the lower floor 10a (see FIG. 1) to the roof lining 10c (see FIG. 1) can be kept in front of the seat cushion 23L by raising the seat cushion 23L.

The term "dive down" means that the seat cushion 23L with the folded stand leg 25L (see FIG. 1) is lowered toward the lower floor 10a (see FIG. 1), and then the seat back 24L (see FIG. 1) is rotated so that the seat back 24L overlies the lowered seat cushion 23L. In this case, the seat cushion 23R (see FIG. 1) and the seat back 24R (see FIG. 1) allow to perform the dive down in the same way.

According to this type of the dive down, a floor (not shown) of a baggage compartment located behind the rear center seat 21 (see FIG. 1) is approximately flush with a back of the seat back 24L (see FIG. 1), and a large front-rear extending baggage compartment can be kept.

By the way, if a conventional seat belt device (see Patent Literature 1) is applied to a vehicle with above seat arrangements, the buckle 8 falls out of a slit formed in the seat cushion 23L when the seat cushion 23L is raised during the tip-up. Then, when the rear center seat 21 is returned from the tip-up to an occupant seated state, the buckle 8 gets between the seat cushion 23L and the seat back 24L, or falls below the seat cushion 23. As a result, the buckle 8 cannot always be placed at the proper position.

Also, in the conventional seat belt device (see Patent Literature 1), when the seat cushion 23L is lowered toward the lower floor 10a (see FIG. 1) during the dive down, the buckle 8 falls out the slit formed in the seat cushion 23L.

Then, the buckle 8 that has fallen out of the slit may be caught in the stand leg 25L (see FIG. 1), which is about to be folded, and may not be able to perform the dive down properly. Also, as in the case of the tip-up, the buckle 8, which has fallen out the slit, may get between the seat cushion 23L and the seat back 24L or fall below the seat cushion 23L when the rear center seat 21 is returned to the occupant seated state.

In contrast, in the seat belt device 1 of this embodiment, one end of the first band 11 (band) inserted into the loop portion 9 is engaged with the buckle 8, and the other end is fixed to the seat back 24L.

According to the seat belt device 1, the buckle 8 can always be placed at the proper position (the initial position) even if the seat cushion 23L and the seat back 24L are displaced by the seat arrangement.

Here, in the seat belt device 1 of this embodiment, it is assumed that the buckle 8 (see FIG. 2) at the initial position is pulled away from the seat back 24L (see FIG. 2) due to a large displacement of the seat back 24L (see FIG. 2) during the seat arrangement.

However, even in such a case, the seat belt device 1 is engaged with the buckle 8 (see FIG. 2) at one end of the first band 11 (see FIG. 2), which is inserted and extended through the loop portion 9 (see FIG. 2), and is fixed to the seat back 24L at the other end. This configuration prevents the engaged position between the first band 11 and the buckle 8 from being shifted by the loop portion 9. As a result, the seat belt device 1 can effectively prevent the buckle 8 from deviating from the initial position due to the displacement of the seat back 24L.

In this embodiment, the first band 11 (band) is maintained along the side surface part of buckle 8 in the circumferential direction between the step part 18 and the loop portion 9.

According to the seat belt device 1, the buckle 8 can be placed at the proper position (the initial position) more reliably even if the seat cushion 23L and the seat back 24L are displaced by the seat arrangement.

According to this configuration, the engaged position between the first band 11 and the buckle 8 can be prevented from being shifted more reliably, even if the seat belt device 1 is set to a so-called "tamperproof mode" to allow the retractor 6 to perform only a retraction of the seat belt 7.

Also, in this embodiment, the loop portion 9 and the step part 18 of the buckle 8 are formed on the boot 16.

According to the seat belt device 1, the loop portion 9 and the step part 18 can be formed of a high impact resistant material of the boot 16, unlike, for example, forming the loop portion 9 and the step part 18 integrally on the buckle body 15.

Also, the buckle body 15 and the boot 16 can be replaced easily if the loop portion 9 and the step part 18 become dirty or defective because the buckle body 15 is separate from the boot 16.

Also, in this embodiment, the webbing 12 is fixed to the seat back 24L via the second band 14 (other band).

According to the seat belt device 1, when the seat back 24L (see FIG. 2) is displaced by the seat arrangement, the webbing 12 connected via the second band 14 (see FIG. 2) is pulled and moved by the seat back 24L (see FIG. 2).

This prevents the buckle 8, which is connected to the webbing 12, from being displaced in the direction of being pulled away from the seat back 24L (see FIG. 2). This allows the seat belt device 1 to more effectively prevent the buckle 8 from deviating from the initial position due to the displacement of the seat back 24L.

Also, in this embodiment, the buckle 8 (see FIG. 2) at the initial position is placed in the container 26 formed on the seat cushion 23L.

According to the seat belt device 1, the design of the corner formed by the seat cushion 23L and the seat back 24L, on which the buckle 8 is placed, can be enhanced. Also, the seat belt device 1 can more effectively prevent the buckle 8 from deviating from the initial position by placing the buckle 8 in the container 26.

Although the embodiment of the present invention has been described above, the present invention is not limited to the aforementioned embodiment and can be implemented in various forms.

Figure 6:
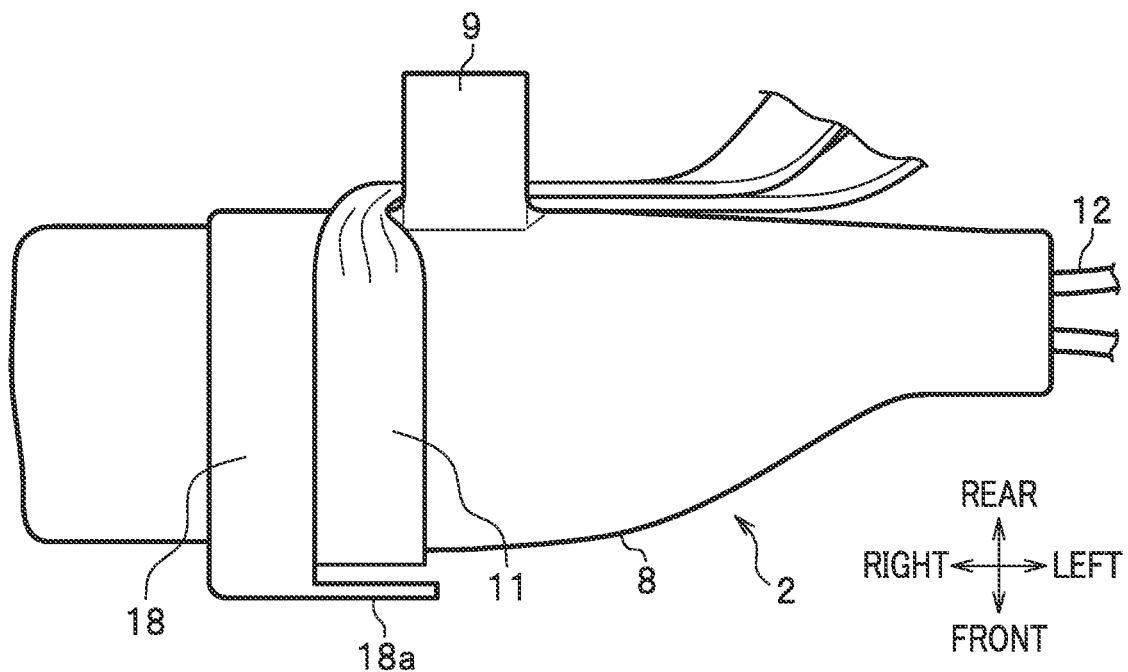
FIG. 6 is a top view of a buckle assembly according to a first modification.

FIG. 6 is a top view of a buckle assembly 2 of a first modification. In FIG. 6, the same components as the above embodiment are indicated with the same reference numerals and their detailed explanation is omitted.

As shown in FIG. 6, the buckle assembly 2 of the first modification has a return cut 18a at the step part 18. According to the buckle assembly 2, the first band 11 can prevented from being shifted more reliably.

Although the embodiment of the present invention applied to the buckle 8 of the rear center seat 21 has been described, the present invention can be applied to the connecting buckle 7 of the rear center seat 21 (see FIG. 1), other buckles 34, 44 (see FIG. 1), and buckles of other seats (not shown).

In the above embodiment, the loop portion 9 is assumed to be formed on the boot 16 among the components of the buckle 8. However, the present invention can be applied to the buckle 8 that has the buckle body 15 and does not have the boot 16. The loop portion 9 of the buckle 8 may be formed on the buckle body 15.

What is claimed is:

1. A vehicle seat belt device comprising:
   a buckle that is positioned so as to face a corner formed by a seat cushion and a seat back those constitute a vehicle seat, and to which a tang of a seat belt is detachably attached;
   a webbing that connects the buckle to a floor;
   a loop portion formed on a side surface part of the buckle; and
   a band that is inserted into the loop portion, is engaged with the buckle at one extending end, and is fixed to the seat back at the other end,
   wherein a step part is formed on the side surface part of the buckle, and the band is maintained along the side surface part of the buckle in a circumferential direction between the step part and the loop portion.

2. The vehicle seat belt device according to claim 1, wherein the buckle has a buckle body and a boot into which the buckle body is fitted, and the loop portion and the step part are formed on the boot.

3. The vehicle seat belt device according to claim 1, wherein the webbing is fixed to the seat back via other band than the band.

* * * * *